3,175,003
O,O'-(HALOMETHYL)PHOSPHINYLIDENE
OXIMES
Marjorie L. Deets, Stamford, Conn., assignor to American Cyanamid Company, New York, N.Y., a corporation of Maine
No Drawing. Filed Dec. 6, 1961, Ser. No. 157,880
6 Claims. (Cl. 260—566)

This invention relates to novel organic compounds and more particularly is concerned with novel O,O'-(halomethyl)phosphinylidene oximes which may be represented by the following general formula:

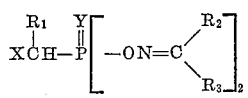

wherein X is halogen, especially chlorine or bromine, Y is oxygen or sulfur, $R_2$ and $R_3$ are lower alkyl, as for example, methyl, ethyl, propyl, isopropyl, butyl and the like, and may be the same or different, and $R_1$ is H, lower alkyl or halogenated lower alkyl.

The novel compounds of this invention may be prepared by reacting an appropriate ketone oxime having the formula:

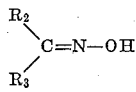

where $R_2$ and $R_3$ are as defined above, with a compound of the formula:

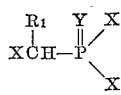

where X, Y and $R_1$ are as defined above. The reaction between the oxime and the phosphonic dihalide, preferably the chloride, is carried out under alkaline conditions in the presence of a suitable polar solvent, such as water or substantial excesses of various ketones such as those employed in the preparation of the ketone oxime reactant. The reaction may also be carried out in non-hydroxylic solvents, such as ether or toluene, employing an organic base, such as pyridine, as acid acceptor; or in substantial excesses of an organic base in which case the organic base serves as both solvent and acid acceptor.

Normally the reaction will be carried out at a temperature range of from about 0° to about 100° C. at atmospheric pressures, although the reaction may be carried out at higher pressures or in the absence of pressure.

The reactants are normally employed in a mole ratio of about one to one, although excesses of either the dihalide or oxime may be employed usually without advantage.

The preparation of the oximes of the present invention may be illustrated by the unbalanced equations set forth hereinbelow.

(1)     $(CH_3)_2C=O + NH_2OH = (CH_3)_2C=N-OH$
(2)
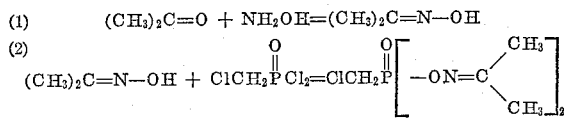

It will be appreciated from the general formula and description set forth above that the oxime may be prepared employing various ketones, preferably and illustratively dimethyl ketone or acetone, ethyl methyl ketone, diethyl ketone, ethyl propyl ketone, dipropyl ketone, dibutyl ketone, and the like. Thus, the derivative (halomethyl)phosphinylidene may, depending upon the ketone employed, be characterized as a symmetrical or non-symmetrical product depending upon whether or not the ketone employed was a simple or mixed ketone.

In order to illustrate the present invention the following examples are given. No specific details or enumerations contained therein are to be construed as limitations on the present invention except insofar as they appear in the appended claims. All parts and percentages are by weight unless otherwise specifically designated.

*Example 1*

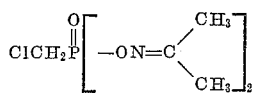

To a solution of 20 parts of sodium hydroxide in 100 parts of water cooled to 10° C. is added 40 parts of acetone and 14 parts of $NH_2OH \cdot HCl$. The mixture is shaken for 10 minutes, cooled to 0° C. and 16.7 parts of $ClCH_2P(O)Cl_2$, chloromethylphosphonic dichloride, is added gradually with shaking. The shaking is continued for 30 minutes, during which time the solution remains in a single phase. The solution is extracted three times with ether and dried over anhydrous calcium sulfate.

Evaporation of the ether solution yields white crystals which are recrystallized from hot water to yield O,O'-(chloromethyl)phosphinylidene bis(N-isopropylidenehydroxylamine) having a melting point of 95–96° C.

Calc'd: C, 34.95; H, 5.86; P, 12.87. Found: C, 35.06; H, 6.16; P, 12.68.

*Example 2*

12 parts of acetone oxime is dissolved in 71 parts of diethyl ether. 16.7 parts of (chloromethyl)phosphonic dichloride is dissolved in 51 parts of diethyl ether and added dropwise with stirring to the acetone oxime over a period of 1½ hours. 15.8 parts (.2 mole) of pyridine is added dropwise simultaneously with the addition of the (chloromethyl)phosphonic dichloride. The mixture is stirred for 2 hours and the pyridine hydrochloride filtered off and the ether evaporated to yield 21 parts of crude material. In this case 4.5 parts of pure dry O,O'-(chloromethyl)phosphinylidene bis(N-isopropylidenehydroxylamine) was recovered.

*Example 3*

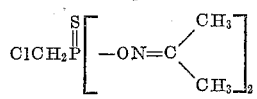

73 parts of acetone oxime is dissolved in an excess of ether. 92 parts of (chloromethyl)phosphonothioyl dichloride dissolved in ether is added dropwise with stirring along with 39 parts of pyridine over a 2-hour period at 25° C. The mixture is stirred overnight, the pyridine hydrochloride filtered off, and the ether layer dried, then evaporated, to yield O,O' - (chloromethyl)phosphinylideneothioyl bis(N-isopropylidenehydroxylamine).

*Example 4*

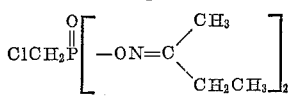

To a solution of 17 parts of methyl ethyl ketone in 50% of aqueous methyl ethyl ketone is added gradually with good stirring 17 parts of (chloromethyl)phosphonic dichloride. The mixture is stirred for 3 hours, then extracted three times with an equal volume of ether. The ether is then dried and evaporated, leaving the product, O,O'-(chloromethyl)phosphinylidene bis(N - 2 - butylidenehydroxylamine).

Example 5

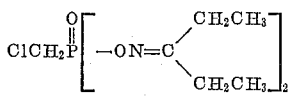

To a well-stirred suspension of 53 parts of finely divided sodium carbonate in an excess of toluene is added 50 parts of diethyl ketone oxime. The suspension is cooled to 10° C. and 42 parts of (chloromethyl)phosphonic dichloride is gradually added. The stirring is continued 2 hours at room temperature after the addition is complete. The salts are filtered off, and the toluene is distilled leaving as residue crude O,O'-(chloromethyl)-phosphinylidene bis(N-3-pentylidenehydroxylamine).

Example 6

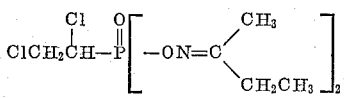

To a suspension of 10 parts of finely divided, anhydrous potassium carbonate in methyl ethyl ketone is added 9 parts of methyl ethyl ketone oxime. With vigorous stirring and cooling as necessary is added 11 parts of 1,2-dichloroethyl phosphonic dichloride. The mixture is gradually heated to reflux and held at reflux for 2 hours. The salts are then removed by filtration and the methyl ethyl ketone is evaporated to leave crude O,O'-(1,2-dichloroethyl)phosphinylidene bis(N - 2 - butylidenehydroxylamine).

Example 7

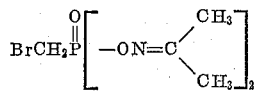

In 200 parts of diethyl ether is dissolved 22 parts of acetone oxime. 90 parts of bromomethyl phosphonic dibromide, dissolved in 200 parts of diethyl ether, is added dropwise to the acetone oxime as 24 parts of pyridine is added simultaneously. The mixture is stirred at room temperature for four hours. The pyridine hydrobromide is then filtered off, the ether layer dried and then evaporated to yield O,O'-(bromomethyl)phosphinylidene bis(N-isopropylidenehydroxylamine).

Other compounds of this invention may be made in similar fashion. Thus, for example, the reaction between methyl propyl ketone and hydroxylamine hydrochloride will produce the corresponding oxime which when subsequently reacted with halomethylphosphonic dihalide will produce an oxime derivative contemplated by this invention. Similarly, dibutyl ketone and other suitable ketones contemplated by the instant invention may be employed to form the corresponding oxime, which in turn when condensed with halomethylphosphonic dichloride will produce the oximes contemplated by this invention.

The compounds of the present invention are highly active insecticides, either by contact or by systemic action.

They may be used as sprays in organic solvents, as emulsions in water or other non-solvents or on solid carriers such as talcs, clays, diatomaceous earth and the like. The insecticidal activity of the compounds of the present invention in controlling various insects is illustrated below.

*Southern armyworm.*—90% kill with the compound of Example 1 at a concentration of 0.1% in a solvent carrier consisting of 65% acetone and 35% water.

*Nasturtium aphid.*—100% kill with the compound of Example 1 at a concentration of .01% in a solvent carrier consisting of 65% acetone and 35% water. 90% kill with the same compound at a concentration of .001% in a solvent carrier consisting of 65% acetone and 35% water.

*Tetranychus telarius* (two-spotted spider mites).— Young Sieva lima bean plants infested with two-spotted spider mites are cut at ground level and inserted into an aqueous emulsion or solution of the test compound. The test is set up with ventilation in a manner to prevent toxic action by other than translocation and counts are made after three days. The compound of Example 1 gave a 100% kill at a concentration of .001% and a 35% kill at a concentration of .0001% in a solvent carrier. The solvent carrier in all cases in this test was 1% acetone and 99% water.

*German cockroach.*—90% kill with the compound of Example 1 at a concentration of 1% on a solid carrier such as fuller's earth and attapulgus clay.

*Milkweed bug.*—100% kill with the compound of Example 1 at a concentrattion of 1% on solid carriers such as pyrophyllite and attapulgus clay.

*Tribolium confusum* (confused flour beetle).—64% kill with the compound of Example 1 at a concentration of 1% on solid carriers such as pyrophyllite and attapulgus clay.

I claim:
1. A compound of the formula

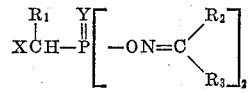

where X is selected from the group consisting of chlorine and bromine, Y is a member selected from the group consisting of O and S, $R_2$ and $R_3$ are lower alkyl, and $R_1$ is selected from the group consisting of H, lower alkyl and halogenated lower alkyl where the halogen is selected from the group consisting of chlorine and bromine.

2. O,O'-(chloromethyl)phosphinylidene bis(N-isopropylidenehydroxylamine).
3. O,O'-(chloromethyl)phosphinylidene bis(N-2-butylidenehydroxylamine).
4. O,O'-(chloromethyl)phosphinylidene bis(N-2-pentylidenehydroxylamine).
5. O,O'-(1,2-dichloroethyl)phosphinylidene bis(N - 2 - butylidenehydroxylamine).
6. O,O'-(bromomethyl)phosphinylidene bis(N-isopropylidenehydroxylamine).

References Cited in the file of this patent
UNITED STATES PATENTS 2,865,719  Kromer _____ Dec. 23, 1958

FOREIGN PATENTS 798,703  Great Britain _____ July 23, 1958

OTHER REFERENCES

Dultz et al.: J. Pharmacol. Exptl. Therap., vol. 119, pp. 422–531 (1957).